No. 726,241. PATENTED APR. 28, 1903.
J. I. AYER.
ELECTRICAL COOKING APPARATUS.
APPLICATION FILED SEPT. 10, 1900.
NO MODEL. 2 SHEETS—SHEET 1.

No. 726,241. PATENTED APR. 28, 1903.
J. I. AYER.
ELECTRICAL COOKING APPARATUS.
APPLICATION FILED SEPT. 10, 1900.
NO MODEL. 2 SHEETS—SHEET 2.

WITNESSES:
E. Driscoll
Frank S. Hartnett.

INVENTOR:
James I. Ayer,
by Roberts & Cushman
Attys.

THE NORRIS PETERS CO., PHOTO-LITHO., WASHINGTON, D. C.

UNITED STATES PATENT OFFICE.

JAMES I. AYER, OF MALDEN, MASSACHUSETTS, ASSIGNOR TO THE SIMPLEX ELECTRICAL COMPANY, OF BOSTON, MASSACHUSETTS, A CORPORATION OF MASSACHUSETTS.

ELECTRICAL COOKING APPARATUS.

SPECIFICATION forming part of Letters Patent No. 726,241, dated April 28, 1903.

Application filed September 10, 1900. Serial No. 29,529. (No model.)

*To all whom it may concern:*

Be it known that I, JAMES I. AYER, a citizen of the United States of America, and a resident of Malden, county of Middlesex, and State of Massachusetts, have invented certain new and useful Improvements in Electrical Cooking Apparatus, of which the following is a specification.

This invention consists in an improvement in the construction of utensils adapted for use with electrically-heated stoves or with electroheating-stands, which are in effect small stoves.

The economy in the use of electroheating for domestic and culinary purposes resides largely in the promptness with which the full heat required is turned on and off and is communicated to the utensil and to the contents thereof. Imperfect heat-conductive contact between the electroheater and the utensil seriously interferes with economical operation of the heater, for the reason that the time required to heat or cook the contents of the utensil is very materially protracted. It is, moreover, of importance to provide utensils which may be as readily placed upon and removed from the stove as in the case of the ordinary coal or gas stoves, and therefore any device which though efficient in producing heat-conductive contact between the utensil and heater is nevertheless complicated or slow in operation will be inadequate to meet practical requirements.

My invention herein described provides means by which utensils can be quickly and efficiently clamped to the electroheating-surface of an electric stove and can be removed therefrom with equal promptness.

Figure 1:
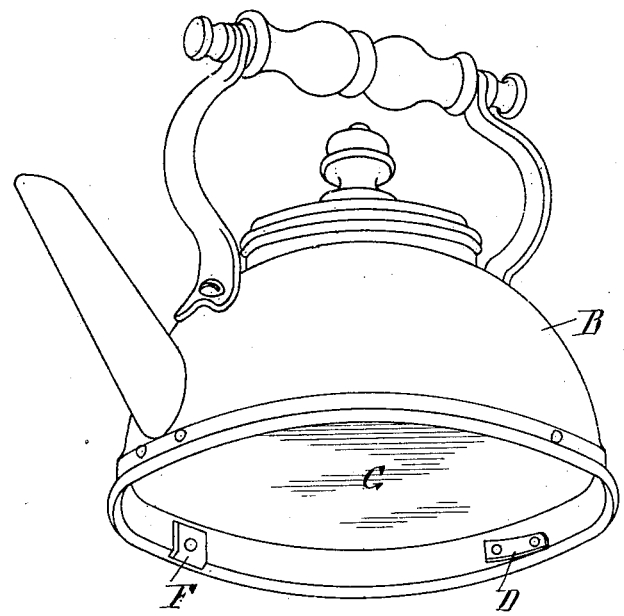
Figure 2:
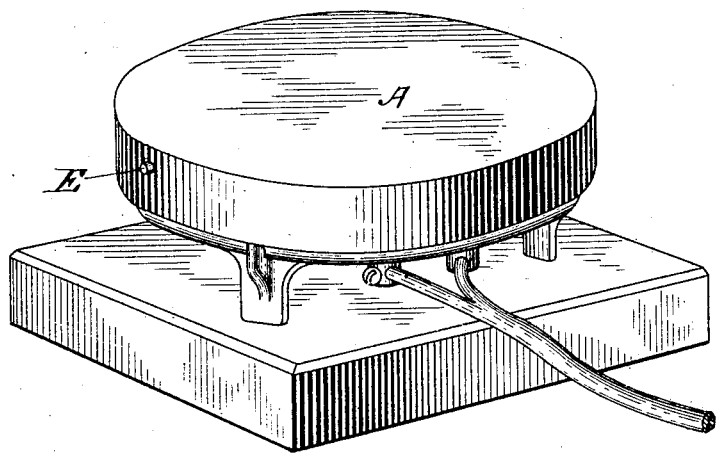
Figure 3:
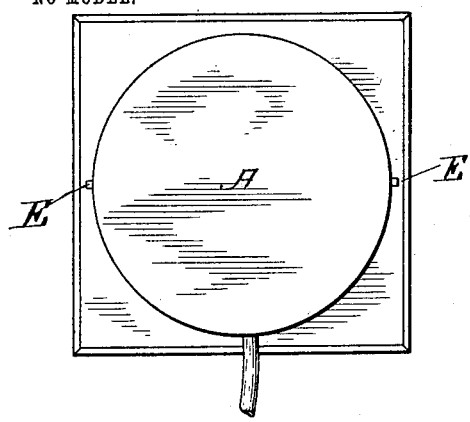
Figure 3:
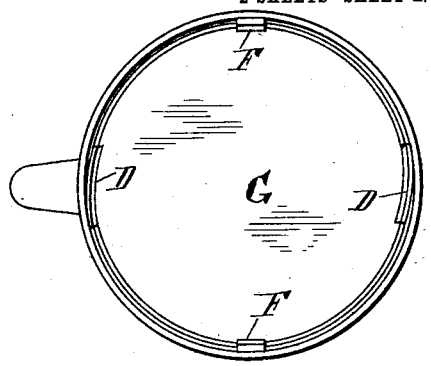
Figure 4:
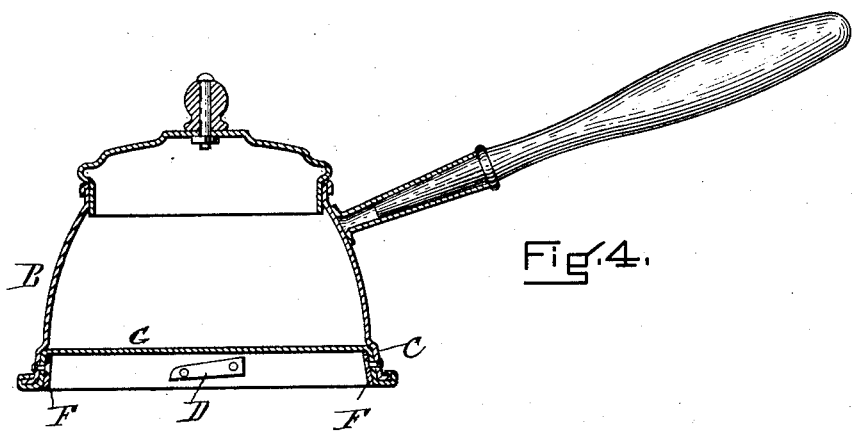
Figure 5:
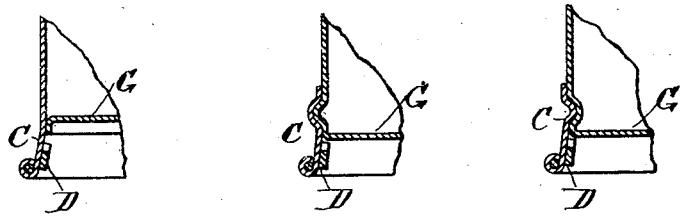

In the drawings which illustrate an embodiment of my invention, Figure 1 is a view in perspective of the bottom of a kettle with my improvement illustrated thereon. Fig. 2 is the cylindrical heater-block now extensively used in electroheating-stoves with an attachment thereon adapting it to coöperate with my improved utensil. Fig. 3 shows a plan view of the top of the heating-block of Fig. 2 and the bottom of the kettle or like utensil of Fig. 1. Fig. 4 shows a vertical longitudinal section of a saucepan with my improvements illustrated, and Fig. 5 shows in cross-section three details of flanged joints adapted to the purposes of a utensil equipped with my improvement.

The heating elements of an electric stove consist usually of individual heaters wherein the heating resistances are inclosed in cylindrical cast-iron blocks, such as illustrated at A in Figs. 2 and 3. Upon these blocks are placed the utensils to be heated. The time required to accomplish the work of heating or cooking is greatly reduced when the intimacy and pressure contact between the bottom of the utensil and top of the heater are increased. In order to enable the person using such a heater to establish and maintain a desirable pressure between the heater and utensil, I provide the following devices, which embody my invention.

Secured to or formed integral with the body B of the utensil a base-flange C is provided, which descends a suitable distance below the bottom G. The internal diameter of the base-flange C is larger than that of the heater-block A, and upon the inside of the flange C I form or secure two projections D, preferably diametrically opposite to each other. These projections D form one member of a binding-joint and, as shown in Fig. 4, are slightly inclined for a purpose presently to be described. I form upon or secure to the heater-block A projections E, which constitute the other members of the binding-joint and are adapted to coöperate with the projections D.

In order to insure the proper centering of the utensil upon the heater-block, I provide also the centering-blocks F, which in the illustration shown are secured to the inner side of the base-flange C. These centering-blocks F are preferably placed opposite each other, so that the distance between their inner faces is practically the same as the diameter of the heater-block A. The binding-joint members D are also preferably of such proportions that when the utensil is placed upon the heater-block they will make a comfortable sliding fit therewith.

In order to place and secure the utensil upon the heater-block, all the person in charge is required to do is to place the utensil upon the block in the ordinary manner, allowing the binding-joint members D and centering-blocks F to find their way over the side of the heater-block A. Then upon giving the utensil a turn (as in the case shown, a turn to the right) the binding-joint members D and E engage with each other and by reason of the inclination or bevel given to the member D in engagement with the binding-joint draw the utensil tightly down on the heater-block, so that the bottom G of the utensil and top A of the heater-block are brought intimately into contact. Before removing the utensil a slight turn to the right is all that is necessary to free the engagement of the binding-joint.

The result of employing this my invention is that in any given case the time required to raise the contents of the utensil to the desired temperature is from one-half to three-fourths the time required when the utensil is merely placed upon the surface of the heater.

In Figs. 4 and 5 I have indicated several forms of flange and flange-joints which I have found will serve the purposes of utensils to which the invention above described is applied.

What I claim, and desire to secure by Letters Patent, is—

An electrical cooking apparatus, comprising a cooking utensil and an electric heating device, provided respectively with heat-transmitting surfaces adapted to contact at every point throughout their adjacent areas, said cooking utensil at its lower peripheral edge being provided with an endless depending base-flange having an internal diameter slightly larger than that of the heating device, said base-flange flaring slightly and being imperforate, and having substantially the same depth throughout its entire extent, said heating device and said base-flange on their contiguous surfaces having coöperating pins and obliquely-arranged binding-joint members for detachably wedging the cooking utensil and heating device together upon relatively rotary movement, substantially as described.

Signed by me at Boston, Massachusetts, this 23d day of August, 1900.

JAS. I. AYER.

Witnesses:
FRANK S. HARTNETT,
ROBERT CUSHMAN.